(12) United States Patent
Matsui et al.

(10) Patent No.: US 6,322,444 B1
(45) Date of Patent: Nov. 27, 2001

(54) VIDEO GAME WITH DISPLAYED BAR FOR INDICATING TARGET POSITION

(75) Inventors: Masanori Matsui, Kobe; Masashi Sakurai, Nagoya, both of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/195,359

(22) Filed: Nov. 18, 1998

(30) Foreign Application Priority Data

Nov. 20, 1997 (JP) .................................................. 9-319679

(51) Int. Cl.[7] ........................................................ A63F 9/24
(52) U.S. Cl. ................................................. 463/7; 463/30
(58) Field of Search ...................................... 463/1–2, 3–5, 463/30–32, 34–35, 37–38, 40, 43, 52, 6–8; 434/62, 69; 473/537

(56) References Cited

U.S. PATENT DOCUMENTS

| | | | |
|---|---|---|---|
| 5,435,554 | * 7/1995 | Lipson ..................................... | 273/88 |
| 5,634,095 | * 5/1997 | Wang et al. ........................... | 395/326 |
| 5,808,613 | * 9/1998 | Marrin et al. ......................... | 345/355 |
| 5,835,085 | * 11/1998 | Eick et al. ............................. | 345/326 |
| 5,926,186 | * 7/1999 | Itoh et al. .............................. | 345/433 |

FOREIGN PATENT DOCUMENTS 5-9590    2/1993   (JP) .

OTHER PUBLICATIONS

Foley et al, "Computer Graphics princilples and practice", second edition, Addition–Wesley Publishing Company, 1990.*
"Monthly Game Walker" Aug. 1, 1996, p. 112.
"Monthly Game Walker" Nov. 1, 1997, p. 109.
"Monthly Game Walker" Sep. 1, 1995, p. 91.

* cited by examiner

*Primary Examiner*—Jessica J. Harrison
*Assistant Examiner*—Kim T. Nguyen
(74) *Attorney, Agent, or Firm*—Jordan and Hamburg LLP

(57) ABSTRACT

A video game system has a controller including a CPU which functions as a controller action detecting unit, a target position calculating unit, and a cursor display control unit, among others. The controller action detecting unit detects X and Y coordinates corresponding to a tilted direction and a tilted angle of a stick-type controller. The target position calculating unit calculates a target position to be reached by a movable character, such as a stone used in curling, based on the X and Y coordinates detected by the controller action detecting unit. The cursor display control unit sends an instruction signal to display a bar indicative of the target position to a signal processor, the bar having a width commensurate with the distance from a predetermined position, such as a stone throwing position, to the target position. Since the bar indicative of the target position and whose width corresponds to the distance up to the target position is displayed in a game image, the game player can easily recognize the distance and the direction to the target position, and is guided to establish the target position.

21 Claims, 8 Drawing Sheets

VIDEO GAME WITH DISPLAYED BAR FOR INDICATING TARGET POSITION

BACKGROUND OF THE INVENTION

1. Field of the Invention

The present invention relates to a video game system using a cassette-type recording medium which may comprise an optical disk, a magnetic disk, or a semiconductor memory that stores program data, a method of indicating a target position to be reached in a video game, and a recording medium that stores a program for indicating a target position to be reached in a video game.

2. Description of the Prior Art

There have been proposed many video game systems. They include a system comprising a game machine for home use only and a television monitor, a system for use as an arcade game machine only, and a system comprising a personal computer or a work station, a display unit, and an audio output unit.

Either of these video game systems is constructed of a manual controller manually operable by the game player, a recording medium storing game program data, a CPU for controlling the generation of audio and image data based on the game program data, a video processor for generating video data, an audio processor for generating audio data, a CRT for displaying images based on the generated video data, and a speaker for reproducing sounds based on the generated audio data. The recording medium is often in the form of a CD-ROM, a semiconductor memory, a cassette with a built-in semiconductor memory, or the like.

One video game that can be played on such video game systems is a game for moving, i.e., shooting or throwing, a movable character displayed on a game screen from a preset position to a target. One example of such a video game is a target shooting game.

In a target shooting game, the game player may be allowed to establish a target position to be reached by a movable character before shooting the movable character at a target. It is desirable to guide the game player to easily establish such a target position.

SUMMARY OF THE INVENTION

It is therefore an object of the present invention to provide a video game system which is capable of guiding the game player to easily establish a target position to be reached by a movable character in a video game.

Another object of the present invention is to provide a method of indicating a target position to be reached in a video game by guiding the game player to easily establish such a target position.

Still another object of the present invention is to provide a recording medium which stores a program to indicate a target position to be reached in a video game by guiding the game player to easily establish such a target position.

According to the present invention, a video game system imparts an initial speed to a movable character in a game space to start moving the movable character from a preset position to a target position. The video game system has display means for displaying a game image, manual control means for entering a manual action of a game player, target position establishing means for establishing a target position to be reached by the movable character in the game image depending on the manual action entered by the manual control means, and display control means for controlling the display means to display a bar extending from the preset position to the target position in the game image when the target position is to be established.

Inasmuch as the bar extending from the preset position to the target position is displayed in the game image, the game player can easily recognize the distance and the direction to the target position, and is guided to establish the target position.

The video game system further may comprise initial value calculating means for calculating an initial speed and an initial direction for the movable character depending on the target position established by the target position establishing means. The movable character can thus start moving from the predetermined position to the target position in the initial direction depending on the target position at the initial speed depending on the target position.

The video game system may further comprise movement control means for controlling movement of the movable character by imparting a predetermined deceleration to the movable character while in motion in the game image. The movable character is decelerated at the predetermined deceleration so that it will stop at the target position.

The manual control means may comprise a stick-type controller having a control stick tiltable from an upstanding position in any directions, including lateral and back-and-forth directions, within a 360° range in response to the manual action, for outputting information representative of a direction in which and an angle through which the control stick is tilted.

The display control means may comprise means for setting a width of the bar to a value commensurate with a distance from the predetermined position to the target position. Specifically, the width of the bar is set to a value which is maximum at the predetermined position and progressively smaller toward the target position. Therefore, the bar is of a tapered shape which allows the game player to clearly recognize the target position and the direction from the predetermined position to the target position, and hence effectively guides the game player to establish the target position.

According to the present invention, there is also provided a method of indicating a target position in a video game for imparting an initial speed to a movable character in a game space to start moving the movable character from a preset position to the target position. The method comprises the step of displaying a bar extending from the preset position to the target position in a game image when the target position is to be established.

According to the present invention, there is further provided a recording medium storing a program for indicating a target position in a video game for imparting an initial speed to a movable character in a game space to start moving the movable character from a preset position to the target position. The program comprises the step of displaying a bar extending from the preset position to the target position in a game image when the target position is to be established.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
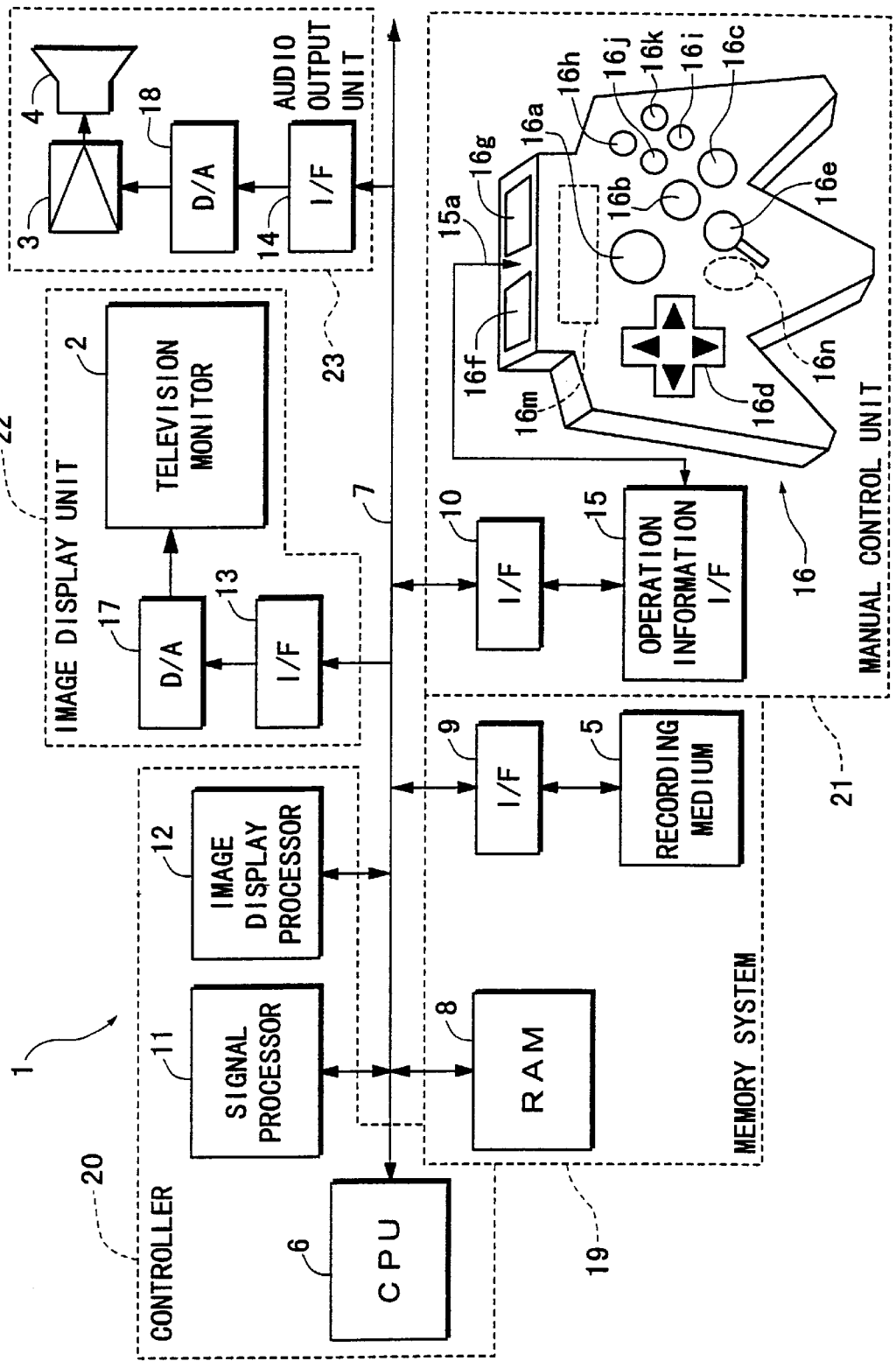
FIG. 1 is a block diagram of a video game system according to the present invention.

As shown in FIG. 1, a video game system 1 according to the present invention generally comprises a system housing (not shown), a television monitor 2 for displaying game images, an amplifier 3 and a speaker 4 for reproducing game sounds, and a recording medium 5 storing game data which comprise video data, audio data, and game program data. The recording medium 5 may comprise a ROM cassette in the form of a ROM storing the game data and program data including an operating system and housed in a plastic case, or an optical disk or a flexible disk.

The system housing accommodates therein a CPU 6 for controlling various components, a bus 7 connected to the CPU 6 and comprising an address bus, a data bus, and a control bus, a RAM 8 connected to the bus 7, an interface 9 connected to the bus 7, an interface 10 connected to the bus 7, a signal processor 11 connected to the bus 7, an image display processor 12 connected to the bus 7, and interfaces 13, 14 connected to the bus 7.

A manual controller 16 which is manually operable by the game player is connected through an operation information interface 15 which is connected through the interface 10 to the bus 7. The interface 13 connected to the bus 7 is connected to a D/A converter 17 which is connected to the television monitor 2. The interface 14 connected to the bus 7 is connected to a D/A converter 18 which is connected to the amplifier 3 connected to the speaker 4.

The RAM 8, the interface 9, and the recording medium 5 jointly make up a memory system 19. The CPU 6, the signal processor 11, and the image display processor 12 jointly make up a controller 20 for controlling the progress of a video game, typically a target shooting game, played on the video game system 1. The interface 10, the operation information interface 15, and the manual controller 16 jointly make up a manual control unit 21. The television monitor 2, the interface 13, and the D/A converter 17 jointly make up an image display unit 22. The amplifier 3, the speaker 4, the interface 14, and the D/A converter 18 jointly make up an audio output unit 23.

The signal processor 11 mainly performs calculations in a three-dimensional space, calculations for conversion from positions in a three-dimensional space into positions in a pseudo-three-dimensional space, light source calculations, and generation and processing of audio data.

Based on calculated results from the signal processor 11, the image display processor 12 writes image data to be displayed into the RAM 8, e.g., writes texture data into an area of the RAM 8 which is designated by a polygon. The manual controller 16 has a start button 16a, an A button 16b, a B button 16c, a cross key 16a stick-type controller 16e, a left trigger button 16f, a right trigger button 16g, a C1 button 16h, a C2 button 16i, a C3 button 16j, a C4 button 16k, a connector 16m, and a depth trigger button 16n.

A memory (not shown) for temporarily storing a progress status of the video game can removably be connected to the connector 16m.

The stick-type controller 16e is essentially identical to a joystick. Specifically, the stick-type controller 16e has a control stick which is usually held in an upstanding position and can be tilted from the upstanding position to a desired angular position about a pivot in any directions, including lateral and back-and-forth directions, within a 360° range. Depending on the direction in which and the angular position to which the control stick is tilted (hereinafter referred respectively as "tilted direction" and "tilted angle"), the stick-type controller 16e sends an X coordinate in the lateral direction and a Y coordinate in the back-and-forth direction, spaced from the upstanding position as an origin, through the interfaces 15, 10 to the CPU 6.

The video game system 1 may be in the form of an arcade game machine, a home game machine, or a computer.

If the video game system 1 is in the form of a home game machine, then the television monitor 2, the amplifier 3, and the speaker 4 are separate from the system housing. If the video game system 1 is in the form of an arcade game machine, then all the component shown in FIG. 1 are accommodated in a single unitary casing.

If the video game system 1 is in the form of a personal computer or a work station, then the television monitor 2 comprises a display unit of the computer, the image display processor 12 comprises part of the game program data stored in the recording medium 5 or hardware on an extension board inserted in an extension slot of the computer, and the interfaces 9, 10, 13, 14, the D/A converters 17, 18, and the operation information interface 15 comprise hardware on an extension board inserted in an extension slot of the computer. The RAM 8 comprises an area of a main memory or an extension memory of the computer.

In this embodiment, the video game system 1 is described as being constructed as a home game machine.

General operation of the video game system 1 will first be described below.

When the power supply switch (not shown) is turned on to energize the video game system 1, the CPU 6 reads the video data, audio data, and game program data from the recording medium 5 based on the operating system stored in the recording medium 5. The video data, audio data, and game program data which have been read are stored partly or wholly in the RAM 8.

Subsequently, the CPU 6 starts and continues a video game based on the game program data stored in the RAM 8 and instructions entered by the game player through the manual controller 16. Specifically, based on instructions entered by the game player through the manual controller 16, the CPU 6 generates commands as tasks for displaying images and reproducing sounds.

Based on the commands generated by the CPU 6, the signal processor 11 performs calculations to determine the positions of characters in a three-dimensional space (which may be a two-dimensional space), light source calculations, and generation and processing of audio data.

Based on calculated results from the signal processor 11, the image display processor 12 writes image data to be displayed into the RAM 8. The image data stored in the RAM 8 is supplied through the interface 13 to the D/A converter 17, which converts the image data into an analog image signal. The analog image signal is supplied to the television monitor 2, which displays an image based on the supplied analog image signal.

The audio data produced by the signal processor 11 is supplied through the interface 14 to the D/A converter 18, which converts the audio data into an analog audio signal. The analog audio signal is supplied through the amplifier 3 to the speaker 4, which reproduces sounds based on the supplied analog audio signal.

A video game played on the video game system 1 will be described below.

In the illustrated embodiment, the video game played on the video game system 1 simulates the game of curling which is a sport played on ice.

Curling is played on ice with two teams of four players alternately delivering stones of granite across an ice surface toward the circular tee in the center of a target area called "house" at each end of a sheet of ice. The team with the stones closest to the tee scores points for each end. Each player grips the handle of the stone and delivers the stone in a form similar to the form used in the game of bowling. To control the stone's speed and direction, and hence the distance that the stone moves, the delivering team's players are allowed to sweep on the ice in front of the stone with a broom.

A displayed image of the video game will be described below with reference to FIG. 2.

Figure 2:
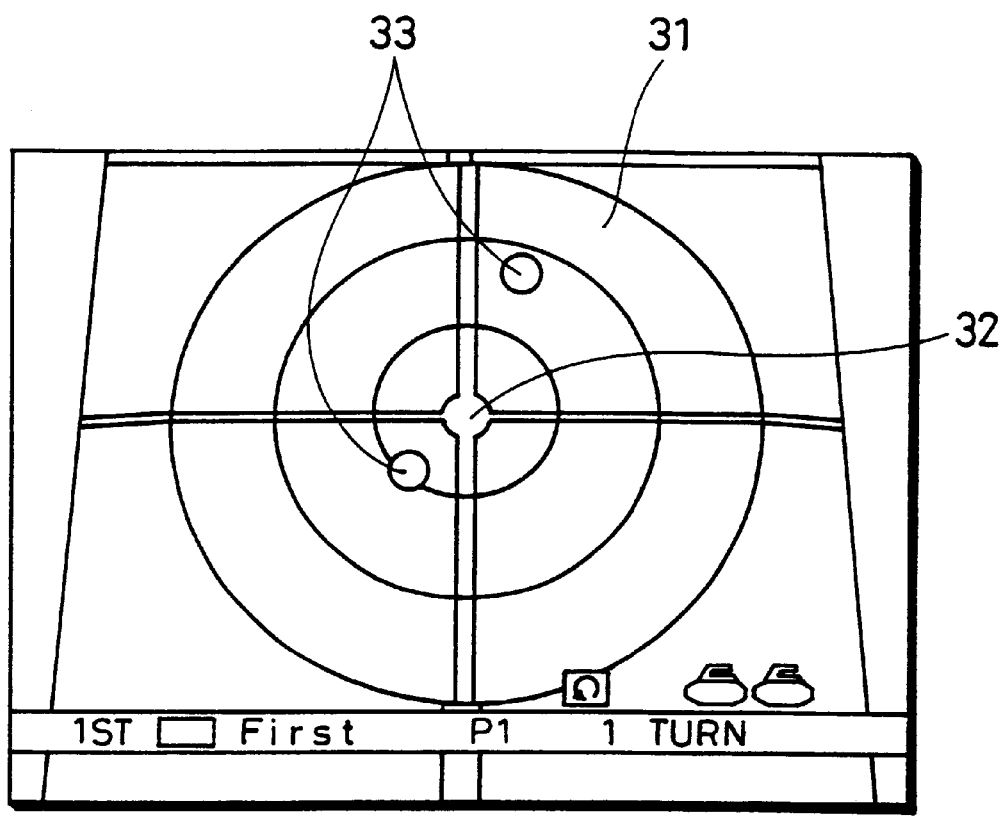
FIG. 2 is a view of a displayed image of a video game played on the video game system shown in FIG. 1.

In FIG. 2, the displayed image contains a circular house 31, as seen from above, with a tee 32 located at the center thereof, a stone 33 positioned closer to the tee 32 (below and on the right of the tee 32), and another stone 33 positioned remoter from the tee 32 (above and on the right of the tee 32).

On the video game system 1, one game player competes with a team controlled by the CPU 6, or a plurality of game players compete each other by alternately operating the manual controller 16.

In the video game, as is the case with an actual curling game, the game player can deliver a stone 33 directly toward the tee 32 as a target, or can deliver a stone 33 toward an opponent team's stone as a target so that the delivered stone 33 will hit and displace the opponent team's stone away from the tee 32.

Before the game player makes an action to deliver a stone 33, the video game system 1 allows the game player to tilt the stick-type controller 16e to establish a target position to be reached by the stone 33 depending on the tilted direction and the tilted angle of the stick-type controller 16e.

A process of establishing a target position to be reached by the stone 33 will be described below with reference to FIGS. 3 through 10.

Figure 3:
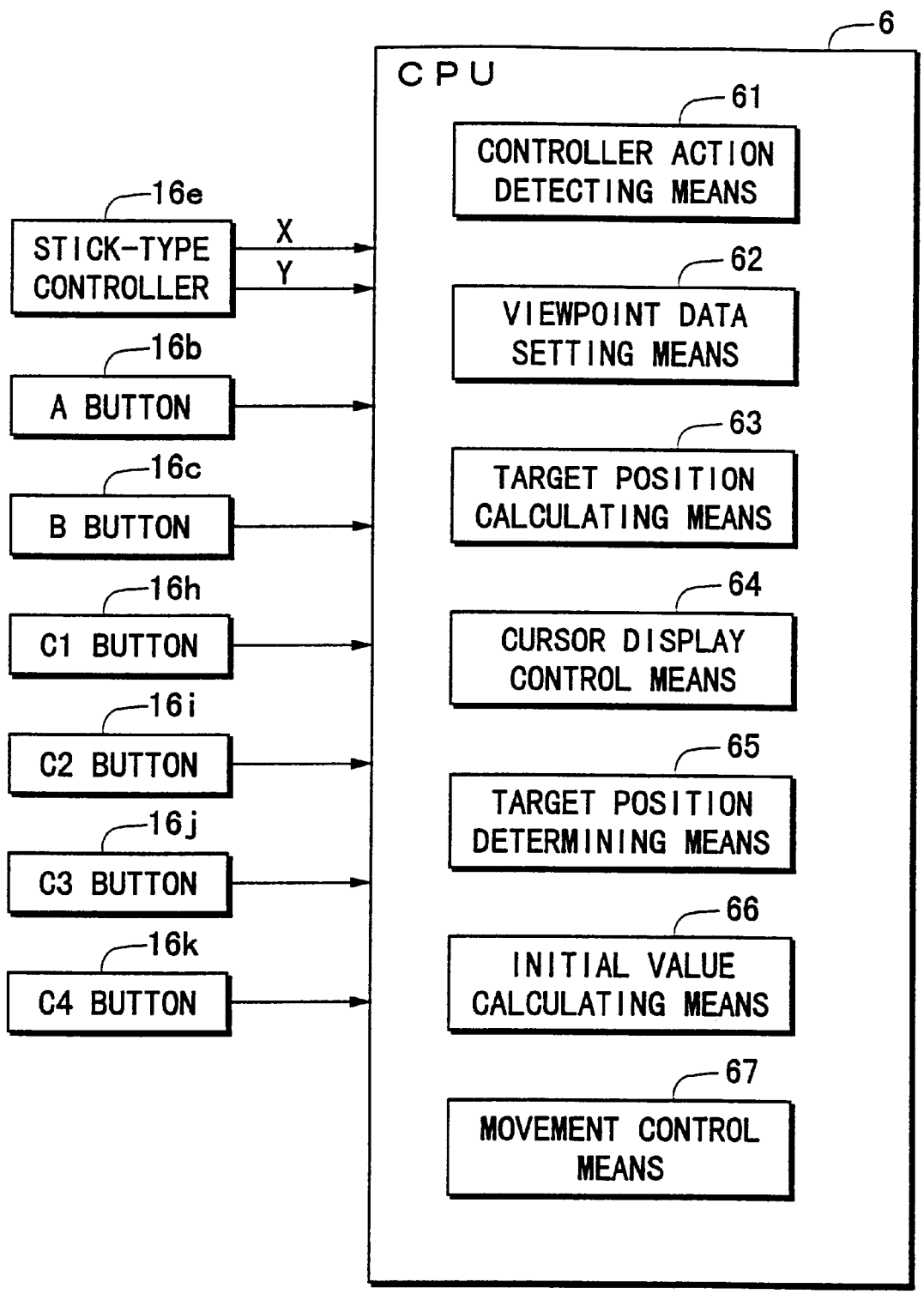
FIG. 3 is a block diagram of functions of a CPU, a stick-type controller, and buttons of the video game system shown in FIG. 1.

FIG. 3 shows in block form functions of the CPU 6, the stick-type controller 16e, and the buttons 16b, 16c, 16h, 16i, 16j, 16k. For the sake of brevity, the interface 10, the operation information interface 15, and the bus 7 are omitted from illustration in FIG. 3.

Figure 6:
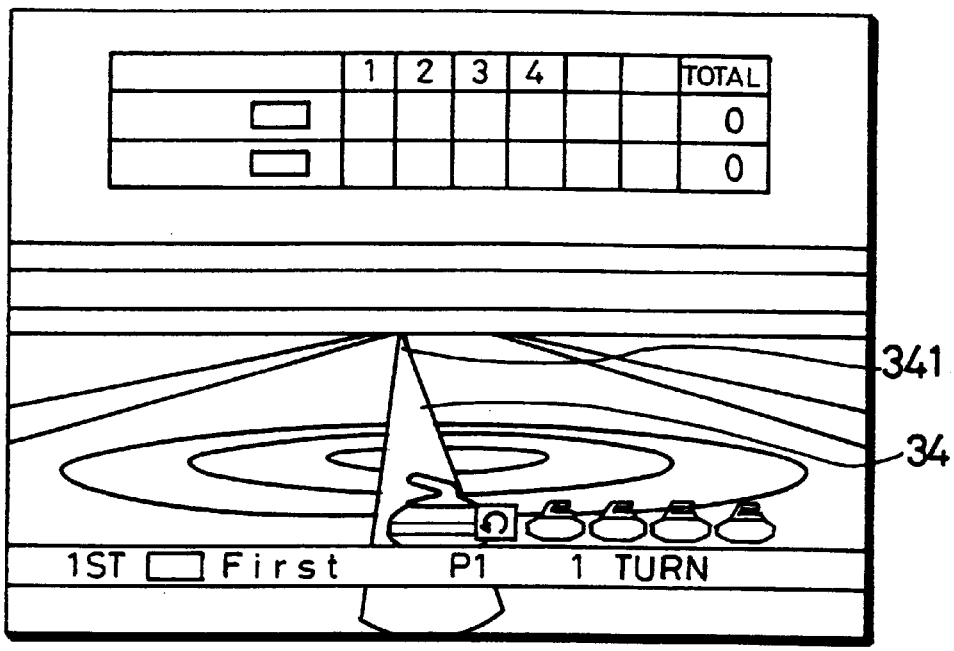
Figure 7:
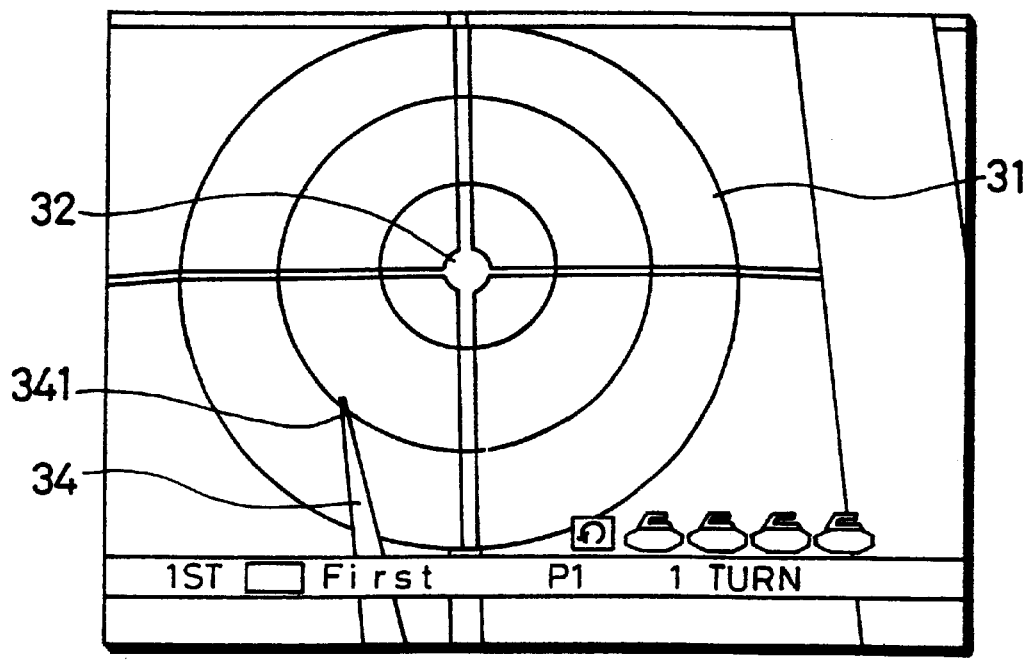
Figure 8:
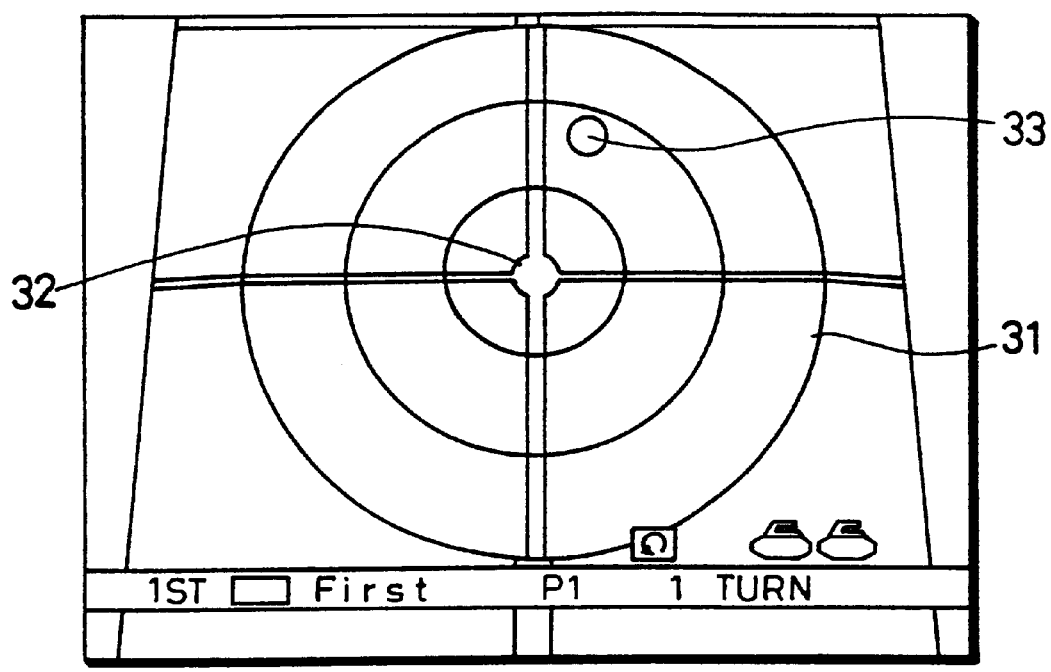
FIGS. 8 and 9 views of displayed images each showing a thrown stone at rest.
Figure 9:
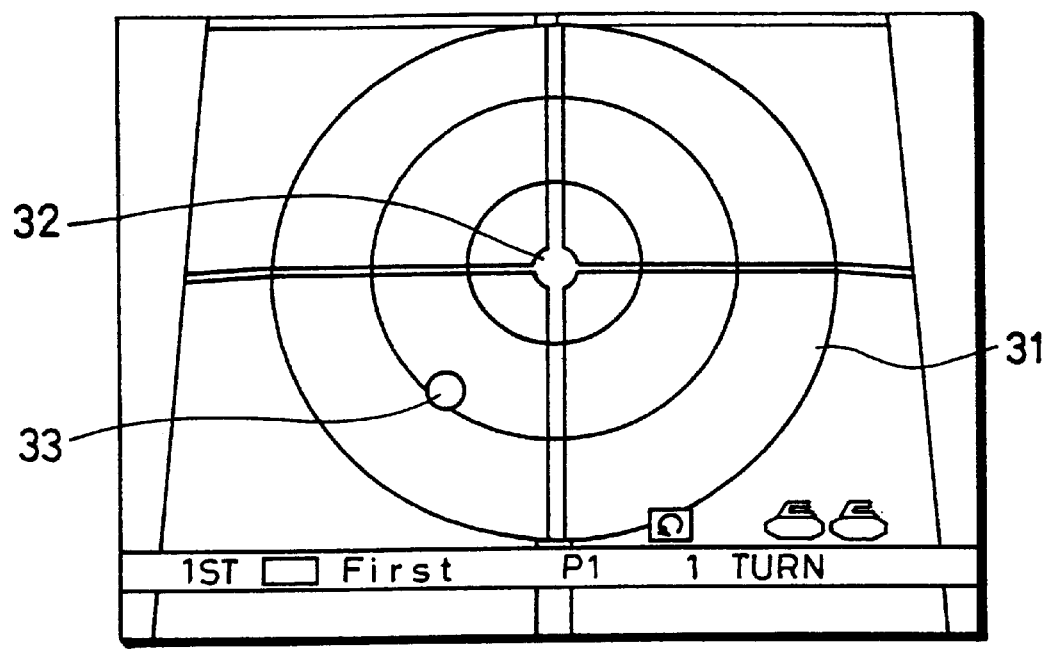
Figure 10:
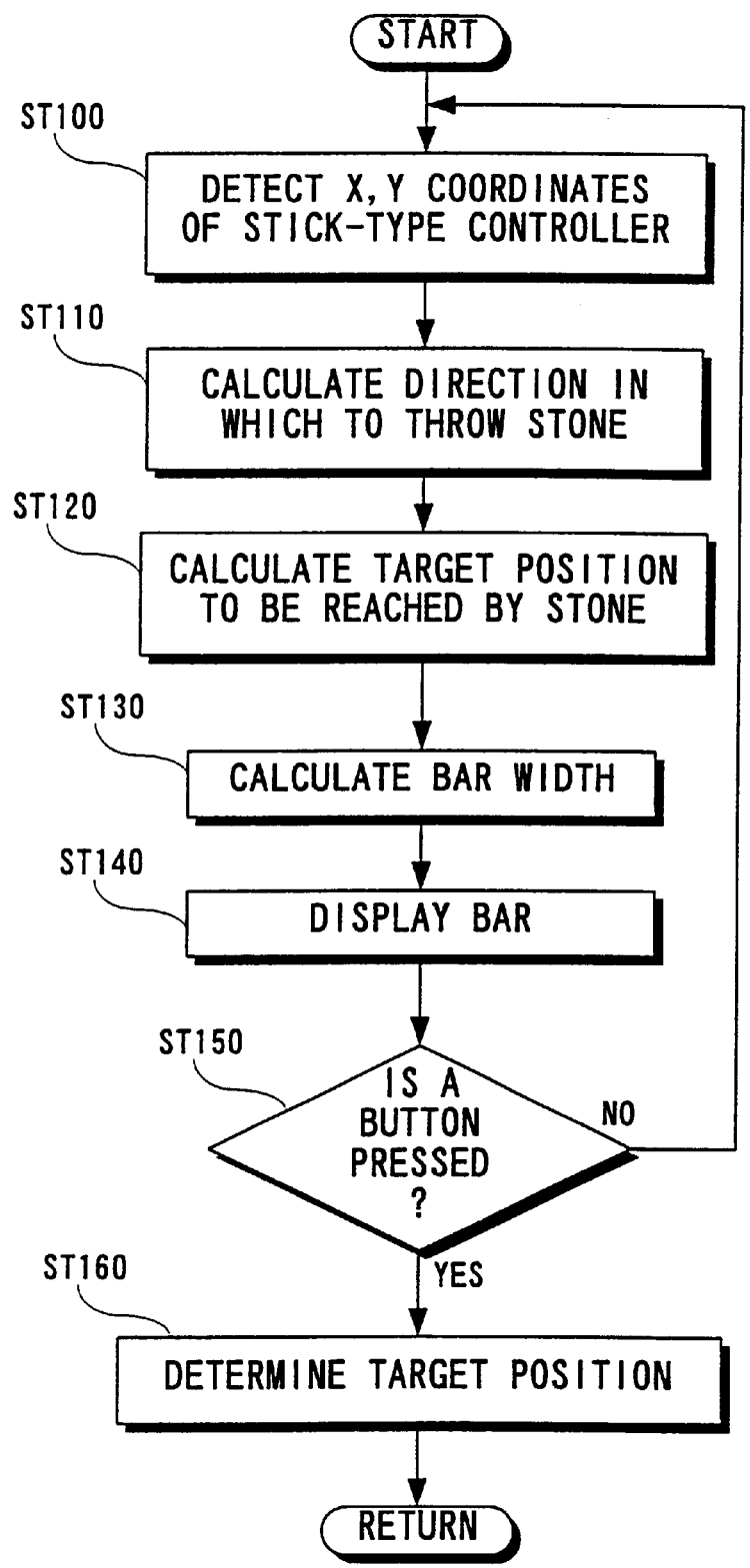
FIG. 10 is a flowchart of a sequence for establishing a target position to be reached.

FIGS. 4 through 7 show displayed images for establishing a target position to be reached, FIGS. 8 and 9 show displayed images each showing a thrown stone at rest, and FIG. 10 shows a sequence for establishing a target position to be reached.

As shown in FIG. 3, the CPU 6 has as its functions a controller action detecting means 61, a viewpoint data setting means 62, a target position calculating means 63, a cursor display control means 64, a target position determining means 65, an initial value calculating means 66, and a movement control means 67.

The controller action detecting means 61 detects turned-on and -off states of the buttons 16b, 16c, 16h, 16i, 16j, 16k, and also detects X and Y coordinates generated by the stick-type controller 16e depending on the tilted direction and the tilted angle of the stick-type controller 16e.

The viewpoint data setting means 62 establishes a viewpoint in an image for establishing a target position, depending on turned-on and -off states of the C1–C4 buttons 16h–16k. The C1–C4 buttons 16h–16k send their turned-on and -off signals as a viewpoint changing instruction to the signal processor 11. For example, a viewpoint is positioned in the vicinity of a stone throwing position 35 behind the sheet of ice in FIG. 4, and positioned substantially directly above a target tee 32.

Figure 4:
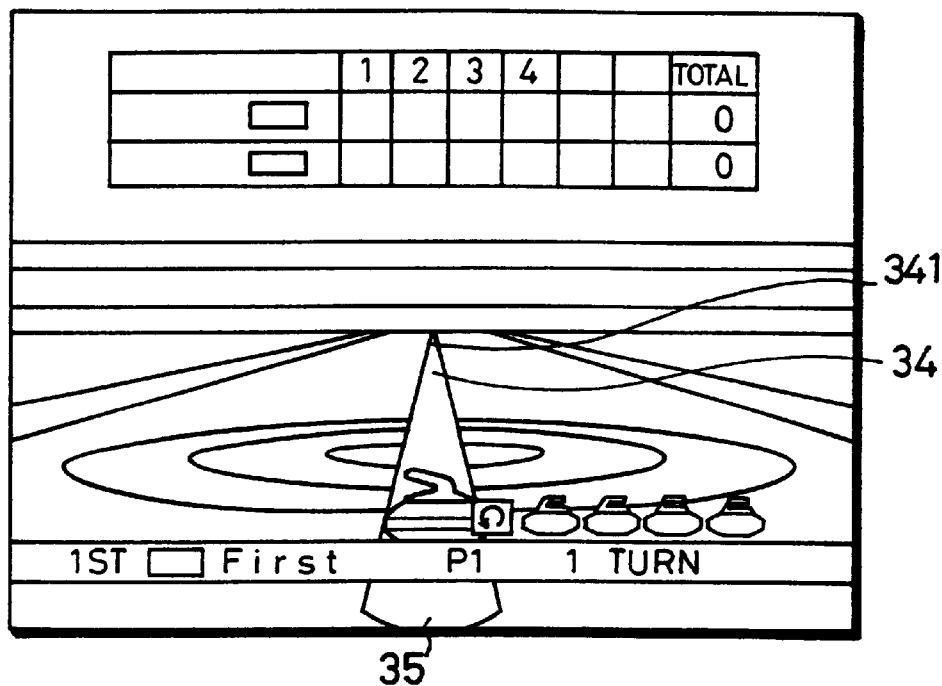
FIGS. 4 through 7 are views of displayed images for establishing a target position to be reached.
Figure 5:
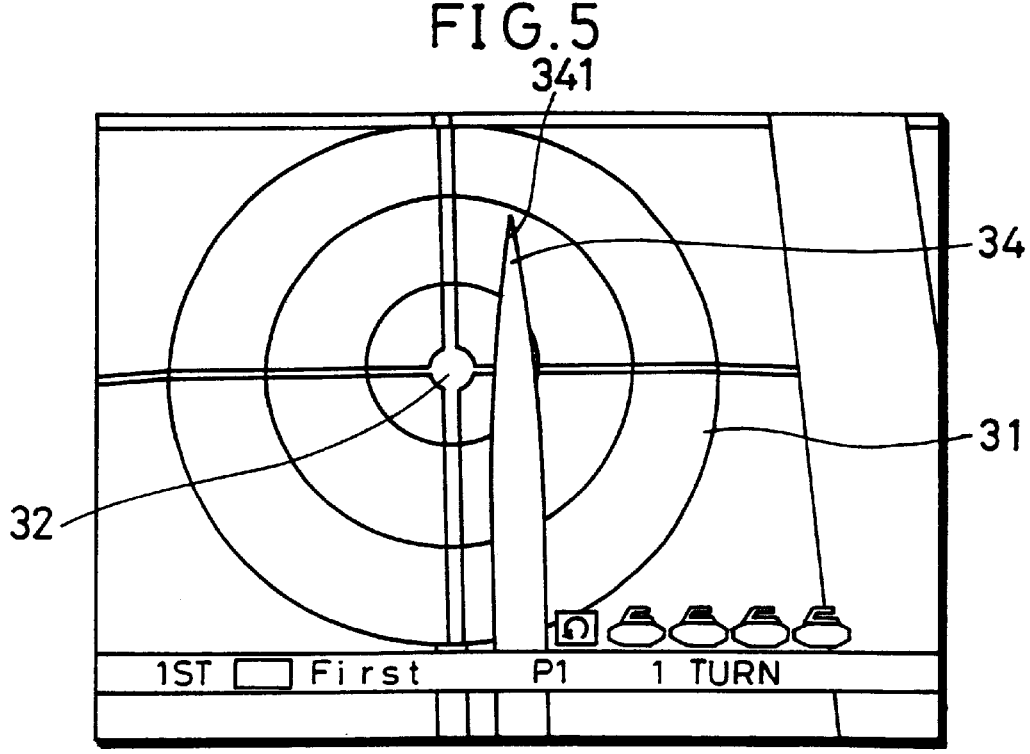

When the C1 button 16h is pressed while the image shown in FIG. 4 is being displayed, the viewpoint moves upward and forward and keeps moving insofar as the C1 button 16h is pressed until the viewpoint reaches a position substantially directly above the target tee 32 as shown in FIG. 5. When the C2 button 16i is pressed while the image shown in FIG. 5 is being displayed, the viewpoint moves downward and backward and keeps moving insofar as the C2 button 16i is pressed until the viewpoint reaches the position as shown in FIG. 4.

The viewpoint keeps moving to the left insofar as the C3 button 16j is pressed, and keeps moving to the right insofar as the C4 button 16k is pressed.

The target position calculating means 63 calculates a target position based on X and Y coordinates produced by the stick-type controller 16e. In thus calculating a target position, the target position calculating means 63 takes into account data representative of the intensity of sweeping.

The intensity of sweeping is determined by the frequency at which the A button 16b is pressed after the throwing of a stone is instructed until the stone stops, i.e., the number of times that the A button 16b is pressed per unit time. The target position calculating means 63 calculates a target position when the frequency at which the A button 16b is pressed is of a predetermined value.

In response to information representative of the target position calculated by the target position calculating means 63, the cursor display control means 64 sends an instruction signal for displaying a bar 34 as a cursor indicative of the target position to the signal processor 11.

Specifically, the cursor display control means 64 determines a width or thickness of the bar 34 (see FIG. 4) depending on, e.g., in proportion to, the distance from the stone throwing position 35 (see FIG. 4) to the target position, i.e., the magnitude of the Y coordinate from the stick-type controller 16e.

The bar 34 comprises a straight bar starting from the stone throwing position 35, and has a tapered arrow-like tip end 341 representative of the target position to be reached by the stone 33.

The bar 34 is displayed such that it looks depending on the viewpoint. In FIG. 4, the bar 34 is displayed as extending from the stone throwing position 35 toward the target tee 32 (not shown in FIG. 4). In FIG. 5, the bar 34 is displayed together with its tip end 341 as the viewpoint is positioned above the target tee 32.

The target position determining means 65 determines the position calculated by the target position calculating means 63 as a target position when the A button 16b is pressed, sends an instruction signal indicative of the determined target position to the signal processor 11, and ends the process of establishing a target position.

The initial value calculating means 66 calculates an initial speed and an initial direction for the stone 33 depending on the target position established by the target position determining means 65. Consequently, the stone 33 can reliably reach the target position according to the initial speed and the initial direction which have been calculated. The movement control means 67 gives frictional forces from the ice to the stone 33 in motion for thereby controlling the movement of the stone 33. The movement control means 67 increases or reduces the frictional forces applied from the ice depending on the intensity of sweeping.

The target position calculating means 63 and the target position determining means 65 jointly make up a target position establishing means.

Since the bar 34 extending from the stone throwing position 35 to the target position is displayed on game images for establishing the target position, the game player can easily recognize the target position to be reached by the stone 33 and the direction in which the stone 33 will move.

The width of the bar 34 is established such that it becomes progressively greater as the distance from the stone throwing position 35 to the target position is greater. Therefore, even when the viewpoint is positioned as shown in FIGS. 4 and 6, the game player can roughly recognize the distance from the stone throwing position 35 to the target position simply by looking at the width of the bar 34.

The width of the bar 34 is selected as being maximum at the stone throwing position 35 and progressively smaller toward the target position, so that the bar 34 is tapered toward the tip end 341 thereof. This tapered shape of the bar 34 allows the target position and the direction from the stone throwing position 35 to the target position to be clearly indicated to the game player, thus effectively guiding the game player to establish the target position.

When the stick-type controller 16e is tilted in a different direction and through a different angle, the initial speed and the initial direction for the stone 33 are changed. Therefore, both the initial speed and the initial direction for the stone 33 can easily be changed by one tilting action of the stick-type controller 16e.

A process of establishing a target position to be reached by a stone 33 will be described below with reference to FIG. 10. In FIG. 10, numerals with a prefix "ST" represent step numbers.

When the stick-type controller 16e is manually operated by the game player, it outputs X and Y coordinates depending on the tilted direction and the tilted angle of the stick-type controller 16e, and the X and Y coordinates are detected by the controller action detecting means 61 in step ST100. Based on the detected X and Y coordinates, a direction in which to throw the stone is calculated in step ST110. Then, a target distance that the stone is to travel is calculated on the basis of the Y coordinate. Based on the calculated direction and distance, a target portion to be reached by the stone is calculated in step ST120.

Then, the width or thickness of a bar is calculated depending on the calculated target position in step ST130, and the bar is displayed in step ST140.

For example, when the stick-type controller 16e is tilted forward to the right, a bar 34 having a relatively large width is displayed as shown in FIG. 4. When the viewpoint is moved to a position above the tee 32, the tip end 341 of the bar 34 is displayed behind and on the right of the tee 32 as shown in FIG. 5.

Conversely, when the stick-type controller 16e is tilted backward to the left, a bar 34 having a width slightly smaller than the width shown in FIG. 4 is displayed as shown in FIG. 6. When the viewpoint is moved to a position above the tee 32, the tip end 341 of the bar 34 is displayed in front of and on the left of the tee 32 as shown in FIG. 7.

Then, it is decided whether the A button 16b is pressed or not in step ST150 (see FIG. 10). If the A button 16b is not pressed (NO in step ST150), then steps ST100–ST140 are repeated.

If the A button 16b is pressed (YES in step ST150), then the presently calculated position is determined as a target position in step ST160. The process of establishing a target position to be reached by a stone 33 is now finished.

After the target position has been established as shown in FIG. 5 or 7, when the game player presses the A button 16b to indicate the throwing of a stone 33, the stone 33 starts moving at an initial speed depending on the target distance, and keeps moving on the ice toward the target position while being progressively slowed down at a predetermined deceleration until it stops at the target position as shown in FIG. 8 or 9.

The distance that the stone 33 moves can be adjusted by the intensity of sweeping, and may not necessarily be stopped always at the established target position. For example, if the frequency at which the A button 16b for indicating sweeping during movement of the stone 33 is pressed is equal to or greater than the predetermined value used in calculating the target position, then the movement of the stone 33 is controlled by corrective calculations to cause the stone 33 to reach a position slightly farther than the target position.

The video game system 1 may be modified as follows:
  (1) The video game system 1 may speed up the video game played thereon. Specifically, when the game player presses the B button 16c while a stone is being delivered, the CPU 6 may issue an instruction signal to the signal processor 11 to increase the speed at which image data is transferred to a display memory or to decimate frames of image data to be transferred to a display memory, for thereby speeding up the video game as long as the B button 16c is pressed. With this modification, the game player may keep pressing the B button 16c to speed up the video game for a next action when a stone thrown by the opponent team controlled by the CPU 6 is sliding on the ice or the game player's team suffers a failure to throw a stone.
  (2) The CPU 6 may function as a first calculating means for calculating an initial speed and an initial direction for a stone 33 depending on the tilted direction and the tilted angle of the stick-type controller 16e, and as a second calculating means for calculating a target position for the stone 33 based on the initial speed and the initial direction which have been calculated. The cursor display control means 64 may display the target position calculated by the second calculating means, with a bar 34. The second calculating means may calculate a target position when the intensity of sweeping, i.e., the frequency at which the A button 16b is pressed, is of a predetermined value.
  (3) In the illustrated embodiment, the video game system 1 has been described as playing a video game simulating the game of curling. However, the principles of the invention are applicable to a video game system for playing any target shooting game in which an initial speed is given to a movable character to throw or shoot the movable character toward a target.

Although a certain preferred embodiment of the present invention has been shown and described in detail, it should be understood that various changes and modifications may be made therein without departing from the scope of the appended claims.

What is claimed is:

1. A video game system for imparting an initial speed to a movable character in a game space to start moving the movable character from a preset position in the game space to a target position in the game space, comprising:

display means for displaying a game image of the game space;

manual control means for entering a manual action of a game player;

target position establishing means for establishing a target position to be reached by the movable character in the game image depending on the manual action entered by said manual control means;

display control means for controlling said display means to display a bar extending from the preset position to an end at the target position in the game image when the target position is to be established; and said display control means comprising means for setting a width of said bar to a value commensurate with a distance from said preset position to said target position.

2. A video game system according to claim 1, wherein said target position establishing means comprises:

first calculating means for calculating an initial speed and an initial direction for the movable character depending on the manual action entered by said manual control means; and second calculating means for calculating said target position based on the initial speed and the initial direction which have been calculated by said first calculating means.

3. The A video game system according to claim 1, further comprising:

initial value calculating means for calculating an initial speed and an initial direction for the movable character depending on the target position established by said target position establishing means.

4. A video game system according to claim 1, wherein said manual control means comprises:

a stick-type controller having a control stick tiltable from an upstanding position in any directions, including lateral and back-and-forth directions, within a 360° range in response to the manual action, for outputting information representative of a direction in which and an angle through which said control stick is tilted.

5. A video game system according to claim 1, wherein said display control means comprises means for setting a width of said bar to a value which is maximum at said preset position and progressively smaller toward said target position.

6. A method for indicating a target position in a video game for imparting an initial speed to a movable character in a game space to start moving the movable character from a preset position in the game space to the target position in the game space, comprising the step of:

displaying a game image of the game space;

entering a manual action of a game player;

establishing the target position to be reached by the movable character in the game image depending on the manual action entered;

displaying a bar extending from the preset position to an end at the target position in a game image when the target position is to be established; and setting a width of said bar to a value commensurate with a distance from said preset position to said target position.

7. A method according to claim 6, further comprising the steps of:

calculating an initial speed and an initial direction for the movable character depending on a manual action entered from a game player; and calculating said target position based on the initial speed and the initial direction which have been calculated.

8. A method according to claim 6, further comprising the step of:

calculating an initial speed and an initial direction for the movable character depending on the target position.

9. A method according to claim 8, further comprising the step of:

controlling movement of said movable character by imparting a predetermined deceleration to the movable character while in motion in the game image.

10. A method according to claim 7, further comprising the step of:

controlling movement of said movable character by imparting a predetermined deceleration to the movable character while in motion in the game image.

11. A method according to claim 6, further comprising the step of:

setting the width of said bar to a value which is maximum at said preset position and progressively smaller toward said target position.

12. A recording medium storing a program for indicating a target position in a video game for imparting an initial speed to a movable character in a game space to start moving the movable character from a preset position to the target position, said program comprising the step of:

displaying a game image of the game space;

entering a manual action of a game player;

establishing the target position to be reached by the movable character in the game image depending on the manual action entered;

displaying a bar extending from the preset position to and end at the target position in a game image when the target position is to be established; and setting a width of said bar to a value commensurate with a distance from said preset position to said target position.

13. A recording medium according to claim 12, wherein said program further comprises the steps of:

calculating an initial speed and an initial direction for the movable character depending on a manual action entered from a game player; and calculating said target position based on the initial speed and the initial direction which have been calculated.

14. A recording medium according to claim 12, wherein said program further comprises the steps of:

calculating an initial speed and an initial direction for the movable character depending on the target position.

15. A recording medium according to claim 14, wherein said program further comprises the step of:

controlling movement of said movable character by imparting a predetermined deceleration to the movable character while in motion in the game image.

16. A recording medium according to claim 13, wherein said program further comprises the step of:

controlling movement of said movable character by imparting a predetermined deceleration to the movable character while in motion in the game image.

17. A recording medium according to claim 12, further comprising the step of:

setting the width of said bar to a value which is maximum at said preset position and progressively smaller toward said target position.

18. A video game system for imparting an initial speed to a moveable object in a game space to start moving the movable object from a preset position in game space to a target position in game space, comprising:

display means for displaying a game image;

manual control means for entering a manual action of a game player;

target position establishing means for establishing a target position to be reached by the movable object in the game image depending on the manual action entered by said manual control means;

display control means for controlling said display means to display a bar extending from the preset position to an end at the target position in the game image when the target position is to be established; and movement control means for controlling movement of said movable object by imparting a deceleration to the movable object while the movable object is in motion in the game image based on input from the game player entered using said manual control means during motion of said moveable object.

19. A video game system according to claim 18, wherein the movement control means applies a force affecting a speed of the movable object.

20. A video game system according to claim 19, wherein the force is a frictional force given from a surface along which the movable object slides.

21. A video game system for imparting an initial speed to a moveable object in a game space to start moving the movable object from a preset position in game space to a target position in game space, comprising:

display means for displaying a game image;

manual control means for entering a manual action of a game player;

target position establishing means for establishing a target position to be reached by the movable object in the game image depending on the manual action entered by said manual control means;

display control means for controlling said display means to display a bar extending from the preset position to an end at the target position in the game image when the target position is to be established;

movement control means for controlling movement of said movable object by imparting a deceleration to the movable object while the movable object is in motion in the game image based on input from the game player entered using said manual control means during motion of said moveable object.

\* \* \* \* \*